D. M. MEFFORD.
Hackling Machine.
No. 30,239.
Patented Oct. 2, 1860.
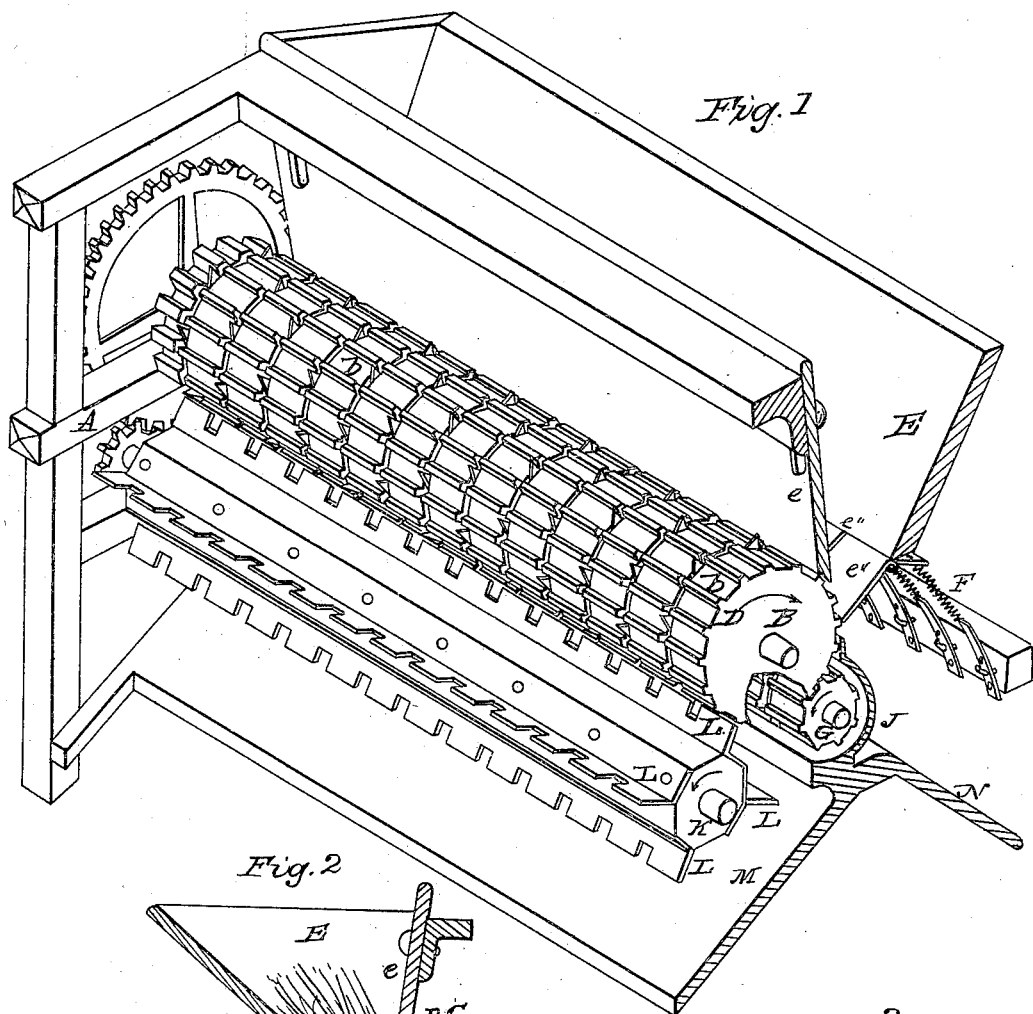
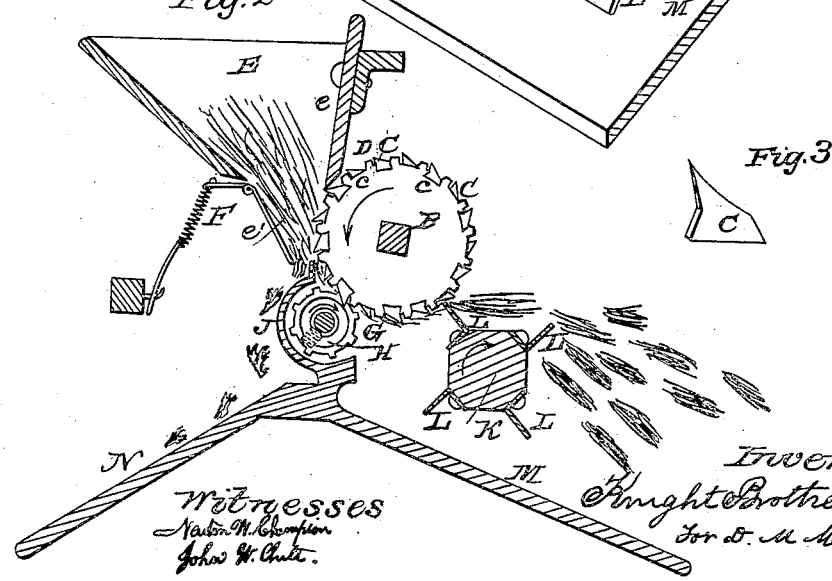

UNITED STATES PATENT OFFICE.

DAVID M. MEFFORD, OF JEFFERSONVILLE, INDIANA.

IMPROVEMENT IN MACHINES FOR STEMMING CORN-HUSKS.

Specification forming part of Letters Patent No. 30,239, dated October 2, 1860.

*To all whom it may concern:*

Be it known that I, DAVID M. MEFFORD, of Jeffersonville, Clarke county, Indiana, have invented a new and useful Machine for Separating Corn-Shucks from their Stubs; and I do hereby declare the following to be a full and exact description thereof, reference being had to the accompanying drawings, making part of this specification.

My invention has for its object the effective and economical separation from corn-shucks of the hard portion at the base of the blades, commonly called the "stub" or "butt;" and it consists of a series of toothed and corrugated cylinders, guard, and strippers, as hereinafter made known.

In the accompanying drawings, Figure 1 is a perspective view of a machine illustrating my invention, part of the frame being removed. Fig. 2 is a transverse section of the operative parts. Fig. 3 is an enlarged view of a tooth.

A frame, A, has journaled horizontally within it a cylinder, B, which I denominate the "picker." This cylinder is composed of a series of short cylinders, $b$, in whose ends are dovetailed cavities $c$, holding teeth C, which point in the direction of rotation. These teeth are rounded on their front and back edges to avoid cutting the stuff. The picker is also armed around its periphery with longitudinal ribs or beads D.

E is a hopper the side next the picker of which is formed by an adjustable feed-board, $e$, and the lower edge of its opposite side by a series of pressure-flaps, $e''$, whose ends are made to bear against the periphery of the picker by means of springs F.

G is what I style the "gripping-cylinder." The said cylinder is grooved latitudinally to accommodate the teeth C, and corrugated or ribbed so as to mesh and revolve in connection with the picker, toward which it is pressed by springs H. A semi-cylindrical concave, J, called the "guard," is fixed concentrically outside of the gripping-cylinder G, and with its upper edge in such proximity to the picker as to effectually prevent any passage of stubs, while it permits the passage of shucks alone between the picker and the gripping-cylinder. A shaft, K, journaled somewhat below and in the rear of the picker, and being armed with notched wings L, and made to revolve rapidly in opposite direction to the picker, acts to remove or strip the shucks therefrom.

M N are chutes which conduct the shucks and stubs, respectively, to opposite sides of the machine.

Operation: The machine being set in operation and the hopper charged with crude shucks, the rotating picker and the pressure-flaps act to impale the shucks upon the teeth C, and to cause their advancing ends to be securely gripped between the cylinders B and G; but the stubs being arrested by the stationary guard J, the swift advance of the shucks results in their separation from the stubs, which pass off down the chute N, while the shucks, passing to the other side, are separated by the stripper K L, and are collected in their appropiate place by the chute M.

By covering the cylinders B and G with india-rubber or other suitable material calculated to grasp the husks with sufficient tenacity, the longitudinal ribs or corrugations on the said cylinders may be dispensed with. The elastic or roughened surfaces, (as the case may be,) serve to grasp the free ends of the husks as they are forwarded to them by the teeth C.

The following is what I claim as new and of my invention herein, as an improvement in machines for "ginning" or "stemming" corn-husks:

The combination of the toothed picker B, griping-cylinder F, and guard J, operating in the manner and for the purposes set forth.

In testimony of which invention I hereunto set my hand.

DAVID M. MEFFORD.

Witnesses:
GEO. H. KNIGHT,
FRANCIS MILLWARD.